May 29, 1962  L. G. GLESMANN, JR., ETAL  3,036,362
MILLING CUTTER FOR GENERATED GEARS

Filed Sept. 4, 1959  2 Sheets-Sheet 1

INVENTORS
LOUIS G. GLESMANN, JR.
HARRY PEDERSEN
ROBERT F. PIGAGE

BY Richard W. Treverton
ATTORNEY

United States Patent Office
3,036,362
Patented May 29, 1962

3,036,362
MILLING CUTTER FOR GENERATED GEARS
Louis G. Glesmann, Jr., Harry Pedersen, and Robert F. Pigage, Rochester, N.Y., assignors to The Gleason Works, Rochester, N.Y., a corporation of New York
Filed Sept. 4, 1959, Ser. No. 838,127
3 Claims. (Cl. 29—103)

The present invention relates to milling cutters of the interlocking type such as are used in cutting straight bevel gears.

Gear cutting machines employing such cutters operate with high efficiency by the completing method disclosed in Carlsen et al. Patent 2,869,427, wherein there is a rolling-generating motion between the cutters and the work gear during semi-finish and finish cutting but wherein a major portion of the stock is first removed from the tooth slots by plunge milling during a dwell in the initial part of the rolling-generating motion.

However, difficulty has been encountered in obtaining the desired tooth shape and quality of surface finish in gears of wide face width and coarse pitch cut by this method. For example the tooth surfaces have had transverse ripples and their lengthwise crowning for tooth bearing localization has been substantially different from the calculated amount. We have determined that these difficulties are eliminated or at least greatly alleviated by having only one finishing blade of the pair of cutters in the cut at one time. This of course may be readily accomplished by widely spacing the cutter blades, but the resulting decrease in number of cutting blades requires a proportionate reduction in the rate of the plunge milling infeed, and this slows down the cutting cycle of the machine so much as to be unfeasible. By the present invention the number of blades effective during the finishing operation is so reduced that only one is in the cut at a time, yet a full complement of blades, three times as many as are employed for finishing, is made available for the plunge milling operation.

According to the invention the number of blades in each cutter is made a multiple of three. The tip edges of all of the blades are at the same distance from the cutter axis, but the side-cutting edges of two of every three blades, i.e. the edges which in the usual cutter would cut the sides of the tooth slot, are inset axially from the corresponding edges of the remaining blades so that they will not cut during the rolling-generating motion. By so arranging the blades in series of three blades, each blade whose side edge does cut during such motion is disposed midway between two corresponding side-cutting blades of the other cutter of the pair. Considering the blades of both cutters, each such side-cutting blade is preceded by and followed by two inset blades. Accordingly without having more than one side-cutting edge at a time in the cut, a gear may be cut whose face width is as large as about one and a half times the circumferential pitch or edge-to-edge spacing of the blades of each cutter.

The invention is illustrated in the accompanying drawings, wherein.

Figure 1:
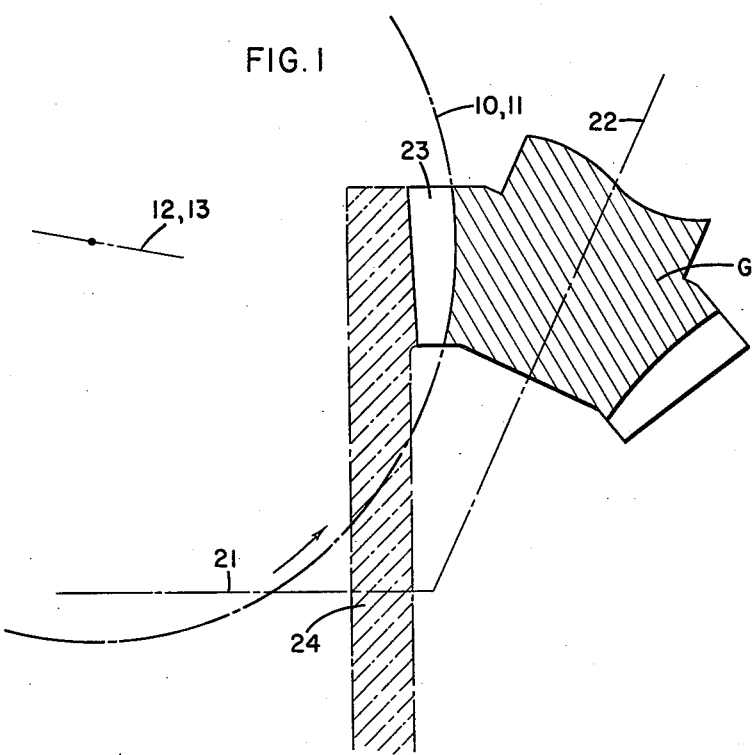
FIG. 1 is a diagram showing the relationship of the cutters to a work gear, as viewed in a direction perpendicular to both axes of the rolling-generating motion.
Figure 2:
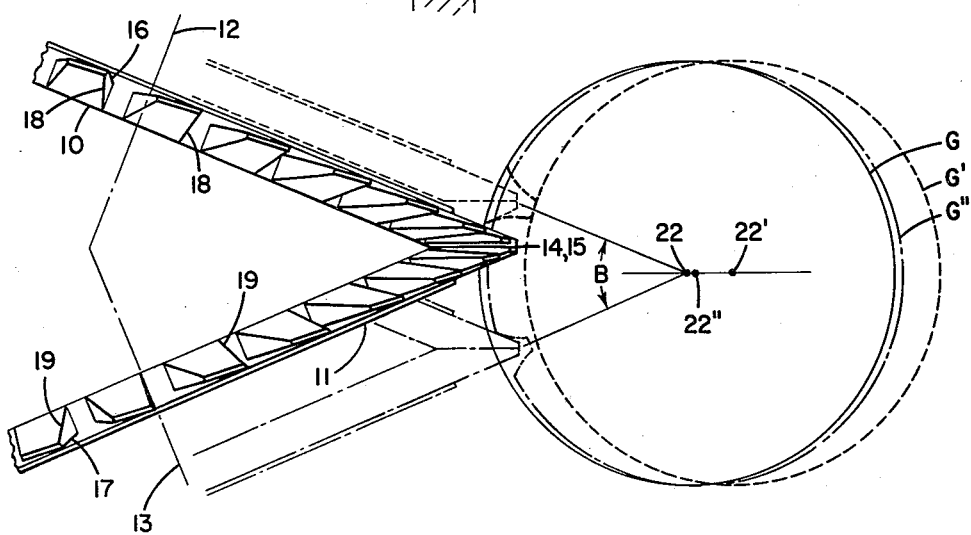
FIG. 2 is another diagram showing the relationship of the cutters and work gear, in a plane approximately at right angles to that of FIG. 1.

The cutting method is illustrated in FIGS. 1 and 2. A pair of interlocking disc milling cutters 10 and 11 are mounted on a gear cutting machine, not shown, for rotation about their respective axes 12 and 13 which are relatively inclined to each other. The blades of each cutter are spaced apart widely enough to accommodate therebetween the blades of the other, so that both cutters may operate at the same time in the same tooth slot of a gear G being cut.

Figure 4:
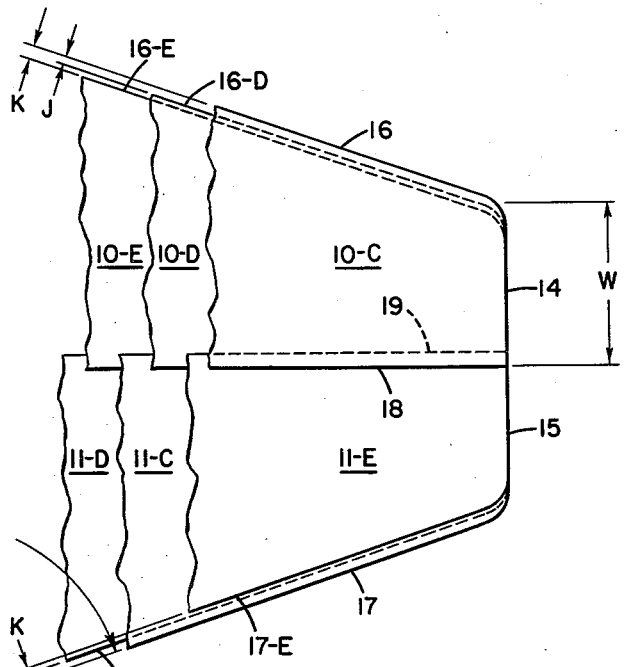
FIG. 4 is a fragmentary view, on a still larger scale, showing six consecutive blades of the pair of cutters as they would appear if rotated about the cutter axes into plane 4—4 of FIG. 3.

The blades of cutters 10 and 11 have tip cutting edges 14 and 15, respectively, adapted to cut the bottoms of the tooth slots, side-cutting edges 16 and 17 for cutting the sides of the slots and non-cutting or clearance side edges 18 and 19. The side-cutting edges of each cutter are disposed in a surface of revolution about the cutter axis which is approximately at right angles to these axes. That is, the angle A, FIG. 4, between axis 13 and the surface of revolution 20 containing edges 17 is on the order of ninety to ninety-seven degrees, so that the surface 20 is either a plane or a shallow internal conical surface, depending upon whether the gear tooth surfaces are to be straight or crowned from end to end.

The cutters and the work gear are supported by the machine for rotation relative to each other about a cradle axis 21 and, at the same time, also about an axis 22 of the work gear G. During this action the cutters represent a tooth 23 of a generating gear 24 with which the gear G being cut has rolling engagement. Assuming that the rotational motions about axes 21 and 22 are applied respectively to the cutters and the work gear, as is usually the case in practice, in the finish cutting operation the effect is to move the cutters upwardly in FIG. 2, from their lower broken line position, to their upper dotted line position, while the work gear rotates clockwise through angle B about axis 22.

In cutting by the method of aforementioned Patent 2,869,427 a blank work gear G is fed into the cutters in the direction of axis 21, to move it from dotted line position G' wherein its axis is at 22' to broken line position G" wherein its axis is at 22". This infeed is effected at a time when the cutters are rotating about their axes 12, 13 but the rolling-generation motion about axes 21 and 22 is arrested with the cutters in their full line position of FIG. 2, which is somewhat above the middle position between their upper and lower terminal positions shown respectively in dotted and broken lines. Most of the stock is removed from the tooth slot during this infeed, and in most cases the greater amount of such stock is cut away by the tip cutting edges 14, 15. Upon the conclusion of this plunge milling the rolling-generating motion takes place. First the cutters move downwardly to their broken line position in FIG. 2 while the gear moves counterclockwise about its axis, at 22". The sides of the tooth slot are semifinished by this action. Then a final infeed occurs, advancing the gear in the direction of axis 21 to its full line position of FIG. 2, in which position its axis is at 22. Next the cutters move upwardly to their dotted line position, accompanied by clockwise rotation of the gear through angle B, to finish cut the tooth slot. The gear is now withdrawn to position G', and, when clear of the cutters, is indexed to enable the next tooth slot to be cut. Such withdrawal and indexing occur during downroll of the cutters from the dotted line cutter position to the full line cutter position of FIG. 2. In this position the rolling motion is again arrested and the plunge milling of the next tooth slot takes place.

According to the present invention the number of blades in each cutter is a multiple of three, for example, eighteen, twenty-four or thirty. The three successive blades of each series of three are designated C, D and E in FIGS. 3 and 4, the blades of the upper cutter being 10–C, 10–D and 10–E and those of the lower cutter 11–C, 11–D and 11–E. Blades 10–C and 11–C have side-cutting edges 16 and 17, while the corresponding side edges 16–D and 16–E, and 17–D and 17–E, are inset by such distances J and K that they will not cut during the rolling generating motion. Inasmuch as this motion constitutes a lateral feed of the cutters which progresses while the cutters rotate, the offset J of a blade D following next after a blade C may be smaller than the offset K of a blade E following second after a blade C. The amounts of offset may be determined either empirically or by calculation based on the rate of the rolling-generating motion. However, as illustrative of the order of the offsets, in a typical case, with a cutter having a point width W of one hundred twenty-five thousandths of an inch (0.125″), offsets J and K respectively of six and ten thousandths of an inch (0.006″ and 0.010″) have been found to be satisfactory. In the cutter illustrated these offsets are constant all along the side edges, the pressure angle of the inset blades D and E being the same as that of the outset blades C. This however is not absolutely necessary, so long as the magnitude of the insetting is such that the side edges of blades D and E do not cut during the rolling generating motion.

Figure 3:
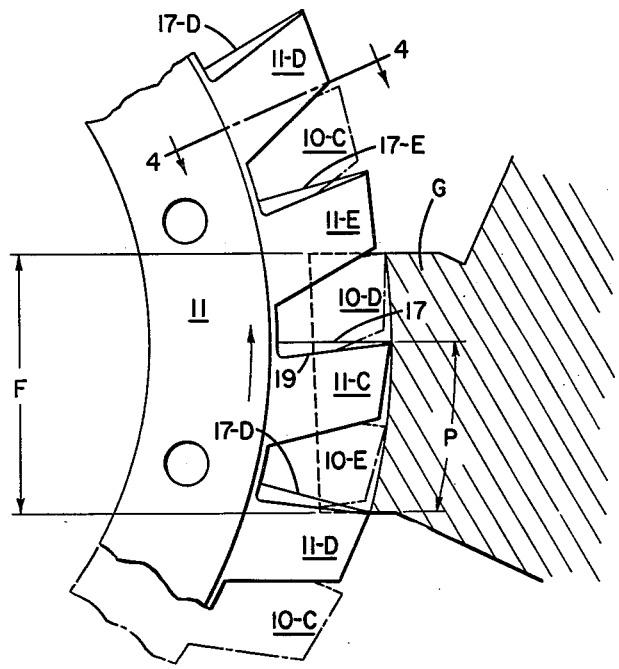
FIG. 3 is a fragmentary view in substantially the same plane as FIG. 1, but on a larger scale, showing one cutter of the pair in solid lines and the other in broken lines.

Referring to FIG. 3, the arrangement of the blades in multiples of three enables each lower side-finishing blade 11–C to be midway between two adjacent upper side-finishing blades 10–C. Two blades with offset edges, such as blades 11–E and 10–D, or 10–E and 11–D, are disposed between each adjacent pair of side-finishing blades. Viewing the pair of cutters as a single cutting device, the active edges of adjacent finishing blades 10–C and 11–C are separated by one and one-half times the circumferential pitch of each cutter, considering such pitch to be the distance P between the cutting edges of adjacent blades of one cutter. It will be seen that a gear having a face width F equal to as much as about one and one-half times this cutter pitch can be produced with only one side-finishing blade 10–C or 11–C at a time in the cut.

Having now described the improved cutters and the manner of using them, what we claim as our invention is:

1. A disc milling cutter for gears comprising one of a pair of cutters adapted for cutting respectively on the opposite sides of the same tooth slot while positioned with their axes of rotation inclined to each other, characterized in that all of the blades of the cutter have tip cutting edges disposed substantially upon a common surface of revolution about the cutter axis, that the number of blades in the cutter is a multiple of three, that every third blade of the cutter has side-cutting edges for finish-cutting a side of the tooth slot, such finish-cutting edges all being disposed upon a common surface of revolution about the cutter axis which is approximately at right angles to such axis, and that the corresponding side edges of the other blades of the cutter are inset from said finish-cutting edges.

2. A cutter according to claim 1 in which the magnitude of the inset is such that said corresponding edges will not cut during relative rolling-generating motion between the cutters and the work gear.

3. A cutter according to claim 1 in which said corresponding edges, of those of said other blades which immediately precede a blade having a finish-cutting edge, are inset by a greater distance than said corresponding edges of the remainder of said other blades.

References Cited in the file of this patent

UNITED STATES PATENTS

| | | |
|---|---|---|
| 2,268,326 | Stewart | Dec. 30, 1941 |
| 2,586,451 | Wildhaber | Feb. 19, 1952 |